United States Patent
Wohl et al.

(10) Patent No.: US 12,277,372 B2
(45) Date of Patent: Apr. 15, 2025

(54) MULTI-CYCLE TEST GENERATION AND SOURCE-BASED SIMULATION

(71) Applicant: Synopsys, Inc., Mountain View, CA (US)

(72) Inventors: Peter Wohl, Williston, VT (US); John A. Waicukauski, Tualatin, OR (US)

(73) Assignee: Synopsys, Inc., Sunnyvale, CA (US)

( * ) Notice: Subject to any disclaimer, the term of this patent is extended or adjusted under 35 U.S.C. 154(b) by 575 days.

(21) Appl. No.: 17/721,264

(22) Filed: Apr. 14, 2022

(65) Prior Publication Data

US 2022/0335187 A1 Oct. 20, 2022

Related U.S. Application Data

(60) Provisional application No. 63/175,595, filed on Apr. 16, 2021.

(51) Int. Cl.
*G06F 30/3308* (2020.01)
*G06F 30/20* (2020.01)
*G06F 30/367* (2020.01)
*G06F 30/396* (2020.01)
*G06F 30/398* (2020.01)

(52) U.S. Cl.
CPC .......... *G06F 30/3308* (2020.01); *G06F 30/20* (2020.01); *G06F 30/367* (2020.01); *G06F 30/396* (2020.01); *G06F 30/398* (2020.01)

(58) Field of Classification Search
CPC .... G06F 30/20; G06F 30/3308; G06F 30/396; G06F 30/367; G06F 30/398
USPC .............................. 716/136, 106, 111; 703/16
See application file for complete search history.

(56) References Cited

U.S. PATENT DOCUMENTS

| | | | | |
|---|---|---|---|---|
| 5,517,506 A | * | 5/1996 | Underwood | G01R 31/318328 714/720 |
| 5,570,397 A | * | 10/1996 | Kubista | G06F 1/04 375/357 |
| 5,583,787 A | * | 12/1996 | Underwood | G01R 31/318328 716/108 |
| 6,320,436 B1 | * | 11/2001 | Fawcett | G06F 1/10 327/158 |
| 6,434,704 B1 | * | 8/2002 | Dean | G06F 1/10 716/133 |
| 6,813,723 B1 | * | 11/2004 | Min | G06F 1/12 716/108 |

(Continued)

FOREIGN PATENT DOCUMENTS

| | | | | |
|---|---|---|---|---|
| KR | 100742406 B1 | * | 7/2007 | ....... G01R 31/31701 |
| WO | WO-2005071426 A1 | * | 8/2005 | ..... G01R 31/318552 |

*Primary Examiner* — Phallaka Kik
(74) *Attorney, Agent, or Firm* — Patterson + Sheridan, LLP

(57) ABSTRACT

A system and method generates test patterns for simulating a circuit design. Generating the test patterns includes determining clock data of the circuit design. The clock data is determined by determining a first clock signal pair from clock signals, and determining a disturb cell based on the first clock signal pair. The disturb cell is electrically coupled to a first clock signal of the first clock signal pair, and to a second cell. The second cell is electrically coupled to a second clock signal of the first clock signal pair, and an input of the second cell is electrically coupled to an output of the disturb cell. A first test pattern is generated based on the clock data and is output to a memory to be used in simulating a circuit design.

20 Claims, 8 Drawing Sheets

(56) References Cited

U.S. PATENT DOCUMENTS

| | | | | |
|---|---|---|---|---|
| 8,117,579 | B2* | 2/2012 | Warnock | G01R 31/318552 |
| | | | | 716/112 |
| 10,482,207 | B2* | 11/2019 | Sugahara | G06F 30/396 |
| 10,884,847 | B1* | 1/2021 | Champoux | G06F 7/584 |
| 2005/0081170 | A1* | 4/2005 | Hyduke | G06F 30/331 |
| | | | | 703/19 |
| 2006/0101362 | A1* | 5/2006 | Haar | G06F 30/30 |
| | | | | 716/113 |
| 2008/0256498 | A1* | 10/2008 | Yabumoto | G06F 30/3323 |
| | | | | 716/103 |
| 2009/0119561 | A1* | 5/2009 | Yokota | G01R 31/2812 |
| | | | | 714/E11.155 |
| 2011/0239031 | A1* | 9/2011 | Ware | G06F 13/1689 |
| | | | | 713/500 |
| 2017/0074935 | A1* | 3/2017 | Bhamidipati | G01R 31/3177 |
| 2017/0193155 | A1* | 7/2017 | Lin | G01R 31/318371 |
| 2018/0341724 | A1* | 11/2018 | Sugahara | G06F 30/3312 |
| 2019/0251928 | A1* | 8/2019 | Du | G09G 5/006 |
| 2020/0111523 | A1* | 4/2020 | Lee | G11C 11/4076 |
| 2020/0313661 | A1* | 10/2020 | Kimura | H03K 3/012 |

\* cited by examiner

MULTI-CYCLE TEST GENERATION AND SOURCE-BASED SIMULATION

RELATED APPLICATION

This application claims the benefit of U.S. provisional patent application Ser. No. 63/175,595, filed Apr. 16, 2021, which is hereby incorporated herein by reference.

TECHNICAL FIELD

The present disclosure generally relates to semiconductor testing systems. In particular, the present disclosure relates to a system and method for providing multi-cycle test pattern generation and source-based circuit simulation for testing semiconductor device designs.

BACKGROUND

The designs of semiconductor devices (e.g., central processing units (CPUs), graphics processing units (GPUs), and other integrated circuit (IC) devices) are tested during the manufacturing process to detect faults and other errors and to ensure proper operation of the semiconductor devices. The testing includes simulating the design of the semiconductor devices based on one or more test patterns. The test patterns are generated via an automatic test pattern generation (ATPG) engine. The test patterns are used to detect faults within the design of the semiconductor device. The test patterns define the clock signals that are transitioned during each cycle of the simulation process.

SUMMARY

In one example, a method includes determining clock data of a circuit design. The circuit design includes clock signals and cells. Determining the clock data includes determining a first clock signal pair from the clock signals, and determining a disturb cell of the cells based on the first clock signal pair. The disturb cell is electrically coupled to a first clock signal of the first clock signal pair. The disturb cell is electrically coupled to a second cell of the cells. The second cell is electrically coupled to a second clock signal of the first clock signal pair and an input of the second cell is electrically coupled to an output of the disturb cell. The method further includes generating a first test pattern based on the clock data, outputting the first test pattern to a memory.

In one example, a system includes a memory storing instructions and a processor. The processor is coupled with the memory and executes the instructions. The instructions when executed cause the processor to determine that a first clock signal pair of a first test pattern is associated with a first source disturb cell of a circuit design. A source disturb cell is electrically coupled to a first clock signal of the first clock signal pair. A second cell of the circuit design is electrically coupled to a second clock signal of the first clock signal pair. An input of the second cell is electrically coupled to an output of the first source disturb cell. The instructions when executed further cause the processor to create a first simulation environment based on the determination that the first clock signal pair is associated with the first source disturb cell, and set a value of the first source disturb cell to an unknown value. Further, the instructions when executed cause the processor to detect a first sink disturb cell based on a determination that the unknown value propagates from the first source disturb cell to the first sink disturb cell, and set a value of the first sink disturb cell to the unknown value and simulating the circuit design.

In one example, a non-transitory computer readable medium comprises stored instructions. The stored instructions when executed by a processor, cause the processor to determine, for a circuit design comprising clock signals and cells, a first clock signal pair of the clock signals and a first source disturb cell of the cells. The first source disturb cell is electrically coupled to a first clock signal of the first clock signal pair. The first source disturb cell is electrically coupled to a second cell of the cells. The second cell is electrically coupled to a second clock signal of the first clock signal pair. Further, the processor is caused to generate a first test pattern based on the first clock signal pair and the first source disturb cell, and create a first simulation environment based on a determination that the first clock signal pair is associated with the first source disturb cell. The processor is further caused to detect a sink disturb cell of the cells based on a determination that an unknown value propagates from the first source disturb cell to the sink disturb cell, and set a value of the sink disturb cell to the unknown value.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
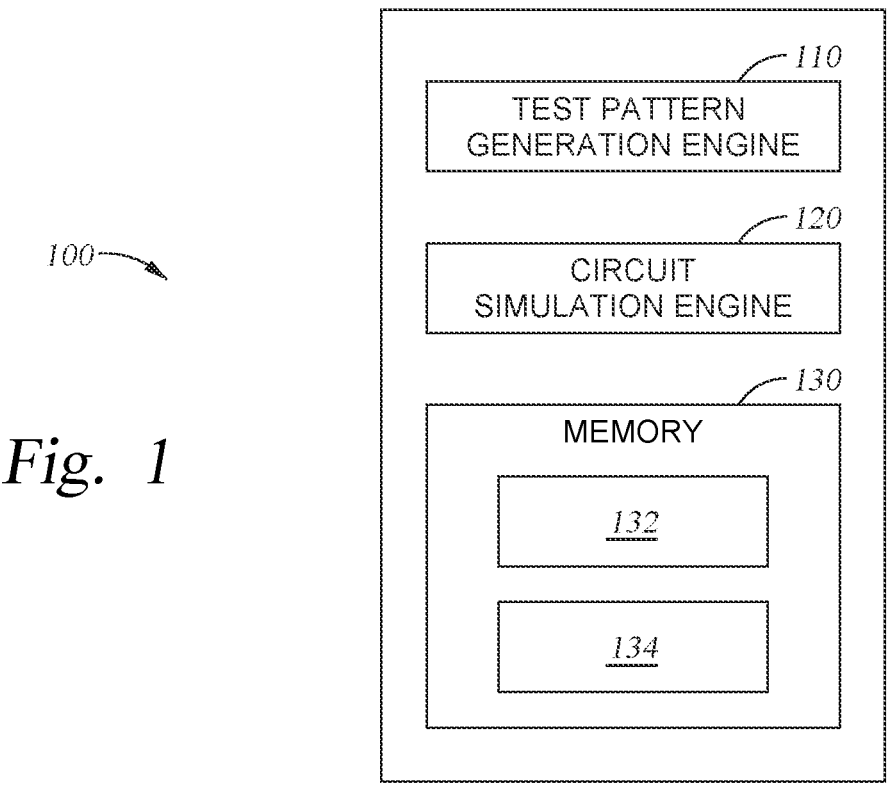
FIG. 1 illustrates a block diagram of a circuit testing system in accordance with some embodiments of the present disclosure.

Aspects of the present disclosure relate to multi-cycle test generation and source-based simulation.

During the semiconductor manufacturing process, the circuit designs of the semiconductor devices (e.g., central processing units (CPUs), graphics processing units (GPUs), and other integrated circuit (IC) devices) are simulated based on test patterns. Test pattern generation includes multiple clock cycles and identifying the state of each clock cycle during each clock cycle. During each cycle of a test pattern, one or more clock signals are turned on and one or more clock signals are turned off. Further, the test patterns may include values that are loaded into cells of the circuit design during the clock cycles. However, typical test pattern generation processes and simulation processes provide an overly pessimistic simulation of a circuit design, underestimating the circuit performance of the circuit design. Further, as the size and speed of the clock architecture of circuit designs increases (e.g., an increase to the number of clock domains), the test pattern count generated by typical test pattern generation processes is increased, increasing the required tester resources and testing time.

The test pattern generation process and simulation process described herein provide an improved circuit design performance through the use of test patterns with reduced unknown values (X-values) while using reduced processor resources by decreasing the test pattern count used to detect faults within a circuit design and processing time as compared to typical processes. Further, the test pattern generation process and simulation process described herein provide an improved test pattern compression in circuit designs that have cross clock-domain logic.

One method for generating test patterns is a sink-based disturbed clocking method. Such a method includes data identification and test pattern generation. Data identification is performed during Design Rules Checking (DRC), and includes determining various cell types and clock signal pair configurations, including sink disturb cells, forbidden clock signal pairs, and allowed clock signal pairs. Sink disturbed cells are cells that are associated with a clock signal pair (e.g., two clock signals), that have a backward connection to a first clock signal of the clock signal pair, and a backward connection to a cell with a backward connection to a second clock signal of the clock signal pair. A forbidden clock signal pair may refer a pair of clock signals that are not allowed. For example, a forbidden clock signal pair refers to two clock signals connected to the same scan cell (e.g., a clock input and a set or reset input). Further, a forbidden clock signal pair may refer to a clock signal pair for which the number of disturbed cells exceeds a threshold number. Allowed clock signal pairs are clock signal pairs that include clock signals that may be turned on during the same clock cycle.

During test generation, the data identified during the data identification process is used to generate the test patterns. The test patterns indicate which clock signals are driven during the cycles of the test patterns. In one example, when a first clock signal is turned on, the clock signals that are forbidden to be paired with it (e.g., part of a forbidden clock signal pair) are turned off. For a potentially disturbed cell, clock signals that may disturb the cell are turned off. Further, cells that may be disturbed by the first clock signal are prevented from being used. During simulation, if two clock signals are turned on in the same cycle, all disturbed cells associated with that clock signal pair are set to an unknown logic value (also referred to as X value herein) and the unknown value is propagated through the circuit design during simulation.

A disturbed cell may be a source disturb cell or a sink disturb cell. A source disturb cell is a disturbed cell that captures and outputs a value based on the first clock signal in an ordered pair of clock signals. A sink disturb cell is a cell that receives a value from a source disturb cell and captures a value based on the second clock signal in the pair of clock signals. A connection is defined to be any path through combinational gates that is not blocked by constraints.

A test pattern includes multiple clock cycles. In one or more example, the test pattern generation process further includes determining the state of the clock signals during the clock cycles of the test period. During each clock cycle, one or more clock signals is turned on and one or more clock signals is turned off. In one example, during at least one clock cycle, multiple clock signals are turned on. Further, test pattern generation includes determining values that are driven onto cells and during which clock cycles the values are driven onto the cells. In one or more examples, the test pattern generation process includes configuring the clock signals with regard to the clock cycles to reduce a number of disturb cells of the circuit design. For example, as is described in further detail in the following, the timing of the clock signals is staggered within the clock cycles of a test pattern to reduce disturbed cells. Accordingly, a corresponding simulation provides a more accurate prediction of the performance of the circuit design.

The simulation process simulates a circuit design to determine the performance of the circuit design based on the test patterns generated by the test pattern generation process. The simulation process detects faults within the circuit design based on the test pattern generation process. As will be described in greater detail in the following, the simulation process determines the propagation of X values (e.g., unknown values) within the circuit design based on the clock signal pairings. The simulation process identifies which cells of the circuit design that are affected by a propagated X value and assigns the affected cells as X value cells. Accordingly, the number of cells having an X value that are generated by the simulation is reduced. Such a simulation process allows for the use of test patterns that have an increased number of clock signals that are pulsed in the same pattern, increasing the number of faults that are detected with a reduced number of test pattern and decreasing the simulation time as compared to other simulation processes. Further, such a simulations process improves the accuracy of the prediction of the circuit design performance as compared to other simulation processes.

FIG. 1 illustrates a circuit testing system 100, according to one or more examples. The circuit testing system 100 is used during the design and/or verification of a circuit design. The circuit testing system 100 includes one or more processors (e.g., the processing device 802 of FIG. 8) that execute instructions (e.g., the instructions 826 of FIG. 8) stored in a memory (e.g., the main memory 804 and/or the machine-readable medium 824 of FIG. 8) to analyze a circuit design (e.g., the circuit design 132) of an IC device. Analyzing the circuit design 132 includes generating test patterns (e.g., the test patterns 134), and simulating the circuit design 132 with the test patterns to identify faults within the circuit design 132. Faults are models for manufacturing defects or errors within the circuit design 132. In one or more examples, faults correspond to incorrect signal values within the circuit design 132.

The circuit testing system 100 of FIG. 1 includes a test pattern generation engine 110, a circuit simulation engine 120, and a memory 130. The test pattern generation engine 110 includes one or more processors (e.g., the processing device 802 of FIG. 8) that execute instructions (e.g., the instructions 826 of FIG. 8) stored in a memory (e.g., the memory 130, the main memory 804 and/or the machine-readable medium 824 of FIG. 8). The test pattern generation engine 110 generates test patterns from the circuit design 132.

In one example, the test pattern generation engine 110 obtains a circuit design 132 from the memory 130, and generates the test pattern or patterns from the circuit design 132 as described in the following. In another example, the test pattern generation engine 110 receives the circuit design 132 from another system (e.g., a system external to or part of the circuit testing system 100) connected to the circuit testing system 100. The circuit design 132 may be received from the external system and stored within the memory 130. In another example, the circuit design 132 is received by the test pattern generation engine 110 directly, and the circuit design 132 is not stored in the memory 130.

The circuit design 132 includes multiple cells and clock signals. The cells represent components of the circuit design 132. In one example, a cell is a group of transistors and interconnects that provide a boolean logic function (e.g., AND gate, OR gate, XOR gate, XNOR gate, and inverter device) or a storage function (e.g., a flipflop device or latch device). Each cell receives one or more clock signals. Further, multiple cells of the circuit design are connected with each other. The cells include source cells that output values captured based on a clock signal. Sink cells receive and capture values from source cells based on clock signals.

Figure 8:
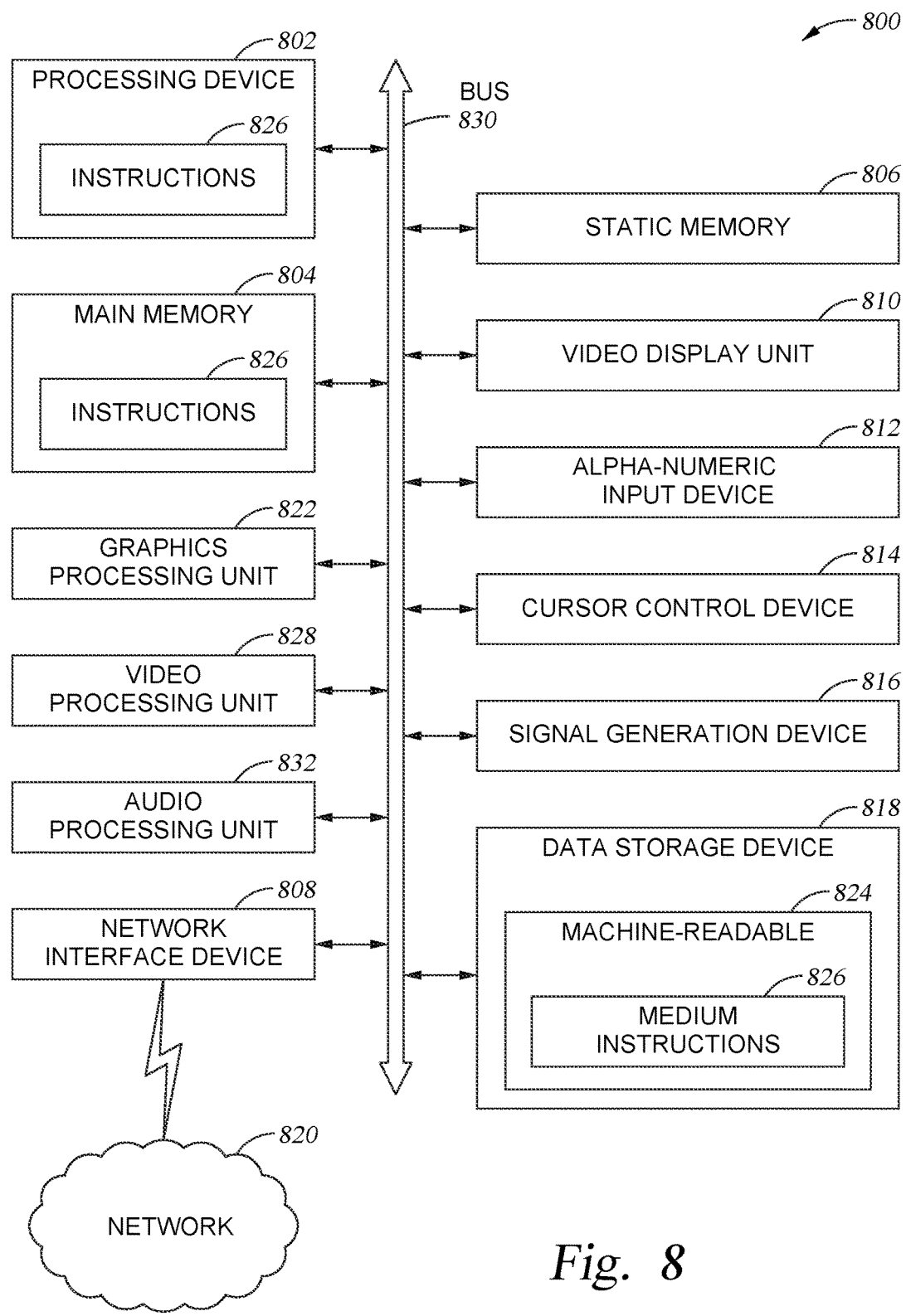
FIG. 8 depicts a diagram of an example computer system in which embodiments of the present disclosure may operate.

The circuit simulation engine 120 includes one or more processors (e.g., the processing device 802 of FIG. 8) that execute instructions (e.g., the instructions 826 of FIG. 8) stored in a memory (e.g., the memory 130, the main memory 804 and/or the machine-readable medium 824 of FIG. 8). The circuit simulation engine 120 simulates the circuit design 132 based on the test pattern 134 to determine the performance of the circuit design 132 and to detect faults within the circuit design 132. In one example, the circuit simulation engine 120 obtains the circuit design 132 and the test patterns 134 from the memory 130. In another example, the circuit simulation engine 120 obtains the circuit design 132 and/or the test patterns 134 from a system external to the circuit testing system 100.

In one or more examples, the circuit testing system 100 includes one or more computer systems. For example, the test pattern generation engine 110 and the circuit simulation engine 120 may be part of different computer systems. The different computer systems may be remotely located from each other. In other examples, the test pattern generation engine 110 and the circuit simulation engine 120 are part of the same computer system of the circuit testing system 100.

The memory 130 may be configured similar to that of the main memory 804 of FIG. 8 and/or the machine-readable medium 824 of FIG. 8. The memory 130 is accessible by the test pattern generation engine 110 and the circuit simulation engine 120. Further, the memory 130 stores the circuit design 132 and the test patterns 134.

Figure 2:
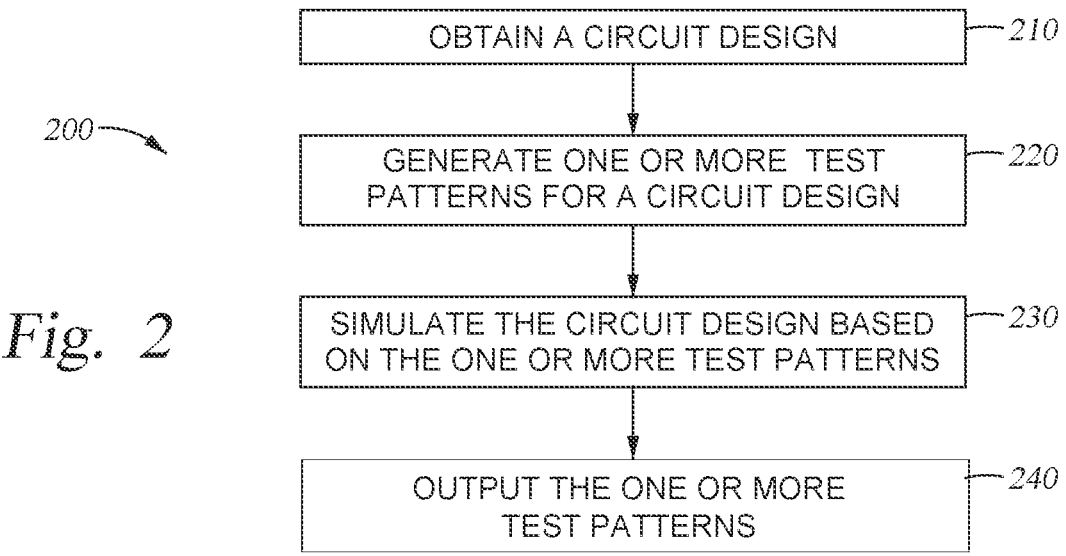
FIG. 2 depicts a flowchart of a method for generating test patterns and simulating a circuit design, in accordance with some embodiments of the present disclosure.

FIG. 2 illustrates a flowchart of a method 200 for evaluating a circuit design. The method 200 is performed by the circuit testing system 100. For example, one or more processors of the circuit testing system 100 executes instructions stored in a memory to perform the method 200. At 210 of the method 200, a circuit design (e.g., the circuit design 132) is obtained by the test pattern generation engine 110. The test pattern generation engine 110 obtains the circuit design 132 from the memory 130, or receives the circuit design 132 from a system external to the circuit testing system 100. Further, the circuit simulation engine 120 obtains the circuit design 132 from the memory 130, or receives the circuit design 132 from a system external to the circuit testing system 100.

At 220 of the method 200, the test pattern generation engine 110 generates one or more test patterns 134 from the circuit design 132. In one example, the test pattern generation engine 110 generates two or more test patterns 134. The test patterns 134 are stored in the memory 130.

At 230 of the method 200, the circuit simulation engine 120 simulates the circuit design 132 based on the one or more test patterns 134. In one example, the circuit simulation engine 120 detects faults within the circuit design 132 and/or determines the predicted performance of the circuit design 132 based on simulating the circuit design 132 with the test pattern or patterns 134. The circuit simulation engine 120 generates a simulation report indicating the faults and/or predicted performance of the circuit design 132.

At 240 of the method 200, the circuit simulation engine 120 outputs the one or more test patterns created. The one or more test patterns 134 are outputted and stored in the memory 130 or to a system external to the circuit testing system 100.

Figure 3:
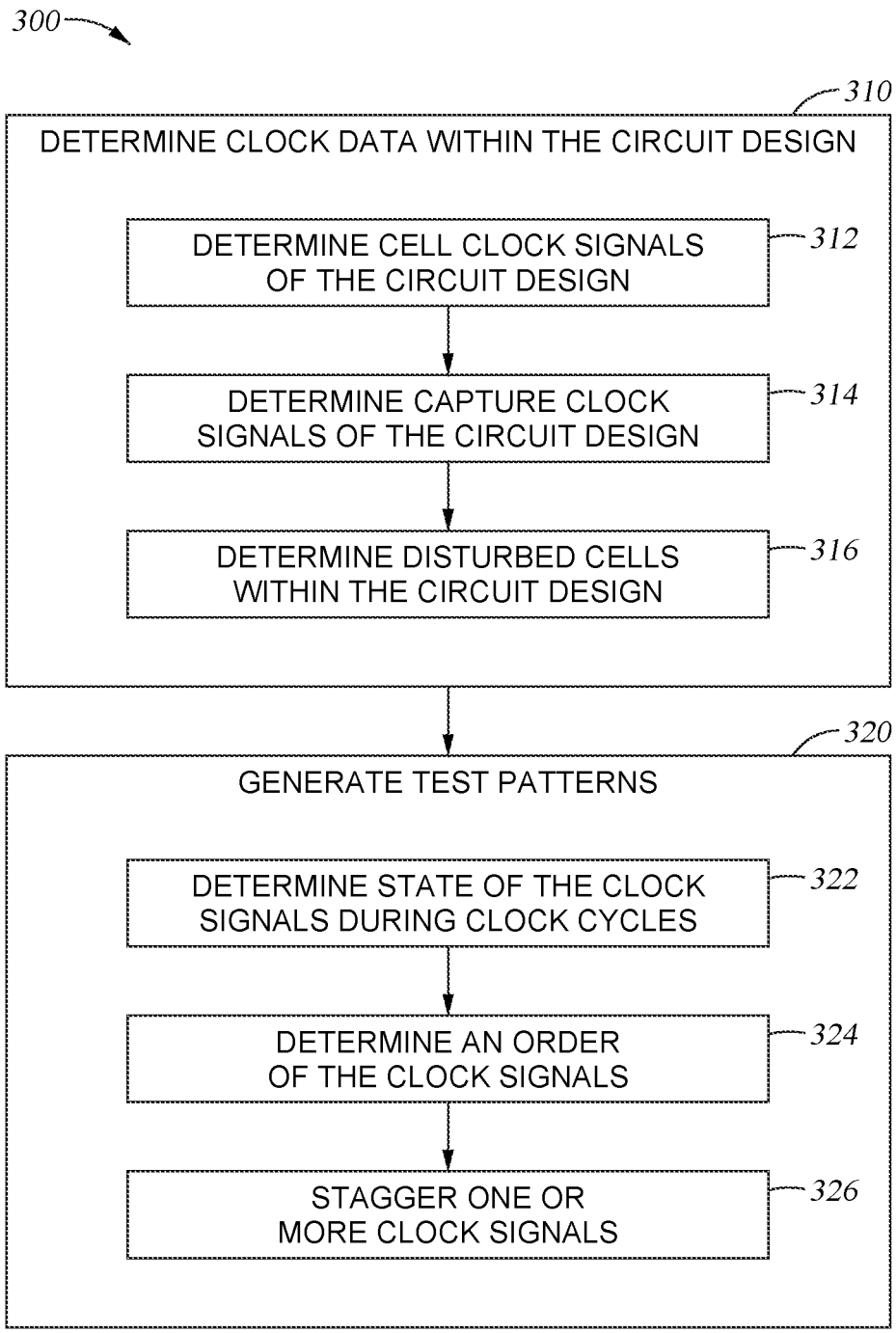
FIG. 3 depicts a flowchart of a method for generating test patterns for a circuit design, in accordance with some embodiments of the present disclosure.

FIG. 3 illustrates a flowchart of a method 300 for generating the test patterns 134. The method 300 is performed by the test pattern generation engine 110. For example, one or more processors of the test pattern generation engine 110 executes instructions stored a memory to perform the method 300. At 310 of the method 300, the test pattern generation engine 110 determines clock data within the circuit design. Determining the clock data includes determining source disturb cells associated with clock signals (e.g., clock sink signals and clock source signals). The source disturb cells are associated with an ordered pair of the clock signals. A cell is considered to be a source disturb cell for a given clock signal pair (e.g., source clock signal, sink clock signal), when the cell captures a value based on the source clock signal, and outputs the captured value to another cell that captures a value based on the sink clock signal.

In one example, determining the clock data includes determining cell clock signals of the cells of the circuit design 132 at 312 of the method 300. A cell clock signal is a signal that is received at the clock input of a cell. A cell that receives a clock signal may be referred to as a clock sink.

Figure 4:
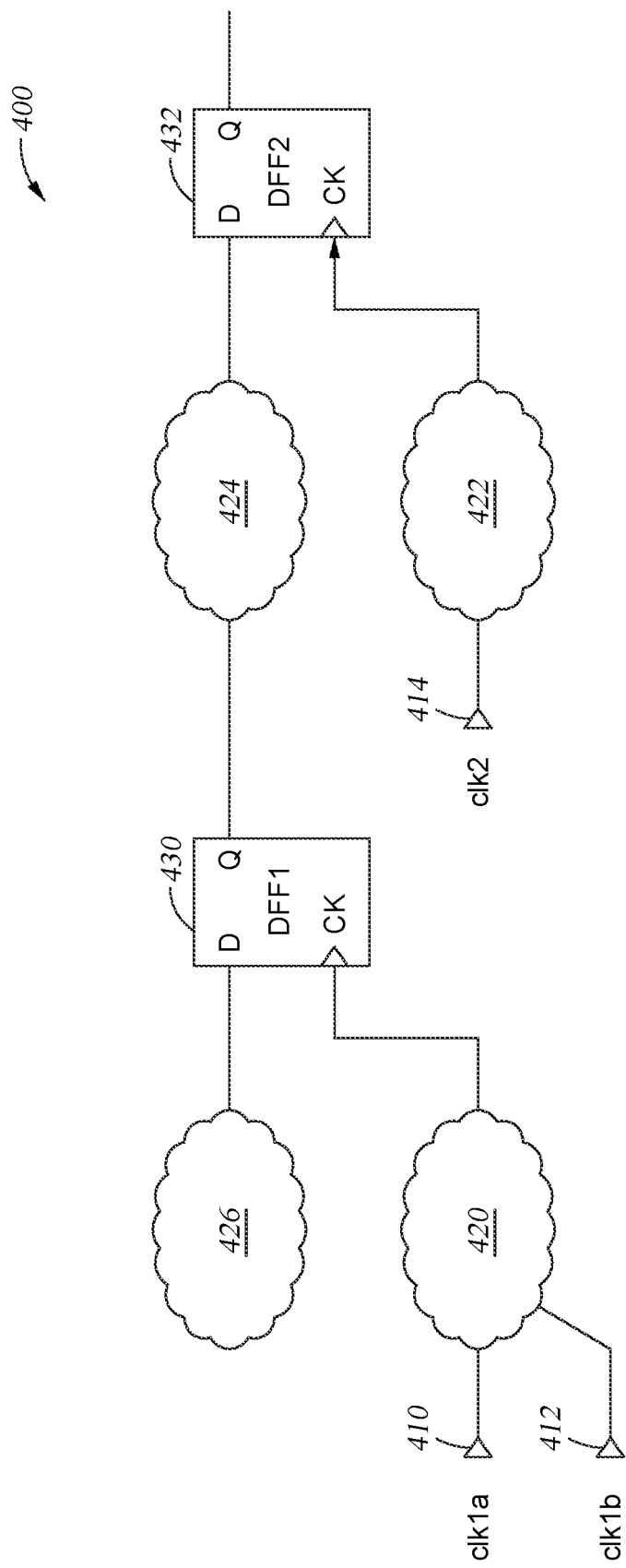
FIG. 4 illustrates an example circuit design, in accordance with some embodiments of the present disclosure.

FIG. 4 illustrates a portion of a circuit design 400. The circuit design 400 includes clock signals clk1*a* 410, clk1*b* 412, and clk2 414. Further, the circuit design 400 includes the logic clusters, 420-426. The logic clusters 420-426 include various interconnected circuit elements of the circuit design 400. The logic clusters 420-426, may be different from each other or similar to each other. The circuit design 400 further includes cells 430 (also labeled as DFF1 in FIG. 4) and 432 (also labeled as DFF2 in FIG. 4). The cells 430 and 432 are flipflops, however, in other examples; other types of circuit elements may be included within the circuit design 400.

The test pattern generation engine 110 determines a path for each clock signal clk1*a* 410, cllk1*b* 412, and clk2 414 through the circuit design 400. For example, the test pattern generation engine 110 performs forward tracing from the clock input associated with each clock signal to a corresponding clock sink (e.g., a clock input of a cell). In one or more examples, forward tracing is performed along the paths (propagation paths) starting from a clock input associated with each clock signal, passing through unconstrained, unblocked path gates to identify cell clock signals for each of the cells of the circuit design 132. In one or more examples, a constrained path has a fixed value (e.g., 0) as the associated signals are a set value. For example, constrained path may include AND gate having one input set to a value of 0. Accordingly, the output of the AND gate is constrained to 0, regardless of the value of the other inputs of the AND gate. An unconstrained path is a path that is not constrained to a specific value. A blocked path is a path that is unable to propagate due to some constraint. For example, a blocked path may include a multiplexer that selects input 0 and does not select input 1 (e.g., constrained to selecting input 0), blocking data on input 1. An unblocked path is a path that does not include any propagation limitations.

The test pattern generation engine 110 performs forward tracing starting from the clock input clk1a 410 to determine the path (e.g., a propagation path) associated with the clock signal clk1a 410. The test pattern generation engine 110 determines that the path associated with the clock signal clka1 410 passes through the logic cluster logic1, and is received by the cell 430. Accordingly, the clock signal clk1a 410 is a cell clock signal for the cell 430. The test pattern generation engine 110 performs forward tracing starting from the clock input clk1b 412 to determine the path (e.g., a propagation path) associated with the clock signal clk1b 412. The test pattern generation engine 110 determines that the path associated with the clock signal clk1b 412, passes through the logic cluster logic1, and is received by the cell 430. Accordingly, the clock signal clk1b 412 is also a cell clock signal for the cell 430. The test pattern generation engine 110 performs forward tracing starting from the clock input clk2 414 to determine the path (e.g., a propagation path). The test pattern generation engine 110 determines that the path associated with the clock signal clk2 412, passes through the logic cluster logic2, and is received by the cell 432. Accordingly, the clock signal clk2 414 is a cell clock signal for the cell 432. Each cell clock signal is stored within the memory 130, according to one embodiment.

With further reference to the method 300 of FIG. 3, at 314, the test pattern generation engine 110 determines capture clock signals within the circuit design to determine clock data. For example, with reference to FIG. 4, the test pattern generation engine 110 determines capture clock signals for the cells 430 and 432. For each clock cell 430 and 432, backward path tracing is applied from a corresponding clock input to identify capture clock signals. Capture clock signals are used by a cell to capture a value. For example, backward path tracing is performed starting at clock input ck of the cell 430. By performing backward path tracing from the clock input ck of the clock cell 430, the clock input ck of the clock cell 430 is determined to be connected to the clock inputs clk1a 410 and/or clk1b 412, via the logic cluster 420. Accordingly, the test pattern generation engine 110 determines that the clock signals clk1a 410 and clk1b 412 are capture clock signals for the cell 430. Further, backward path tracing is performed starting at the clock input ck of the cell 432. By performing backward path tracing from the clock input ck of the cell 432, the clock input ck of the clock cell 432 is determined to be connected to the logic cluster 422 and to the clock input clk2 414. Accordingly, the clock signal clk2 connected to the clock input 414 is determined to be the capture clock signal for the cell 432. The cells along the propagation path of clk1a have a capture clock signal of clk1a. The cells along the propagation path of clk1b have a capture clock signal of clk1b. The cells along the propagation path of clk2 have a capture clock of clk2. The capture clock signal and the associated cells are stored in the memory 130, according to one embodiment.

Returning to FIG. 3, at 316 of the method 300, source disturb cells within the circuit design are determined by the test pattern generation engine 110. With reference to FIG. 4, the test pattern generation engine 110 identifies clock signal pairs from the identified cell clock signals and capture clock signals determined at 312 and 316 of the method 300. The cell clock signals are source clock signals and the capture clock signals are sink clock signals. A clock signal pair includes two clock signals. Each clock signal pair includes a first clock signal (source clock signal) and a second clock signal (sink clock signal). Accordingly, each clock signal pair includes a cell clock signal and a capture clock signal. With reference to FIG. 4, a first clock signal pair includes clk1a 410 and clk1b 412; a second clock signal pair includes clk1a 410 and clk2 414; and a third clock signal pair includes clk1b 412 and clk2 414. The clock signal pairs may be stored in the memory 130.

The clock signal pairs are used to determine source disturb cells within the circuit design, e.g., the circuit design 400 of FIG. 4. The source disturb cells may be determined based on the clock signal pairs. For example, if a first cell captures a value based on a first clock signal of a clock signal pair, and a second cell receives the captured value based on a second clock signal, the first cell is determined to be disturbed. Such a disturbed cell may be referred to as a disturbed source cell as the disturbed cell is a source for (e.g., outputs a signal) to another cell. In one example, with reference to FIG. 4, for the clock signal pair including clock signals clk1a and clk2, the cell 430 is determined to be a disturbed cell. The cell 430 is determined to be a disturbed cell as the clock signal clk1a 410 is a cell clock signal of the cell 430, and the clock signal clk2 414 is a capture clock signal of the cell 432, which is connected to the output of the cell 430. To determine a source disturb cell, connections (e.g., forward and backward connections) between the cells of the circuit design 400 are determined. For example, the test pattern generation engine 110 determines that there is a forward connection between the output Q of the cell 430 and the data input D of the cell 432 via the logic cluster 424. As the output Q of the cell 430 is connected to the data input D of the cell 432, the clock input ck of the cell 430 is connected to the clock input clk1a 410, and the clock input ck of the cell 432 is connected to the clock input clk2 414, the cell 430 is determined to be a source disturb cell for the clock signal pair including clock signals clk1a and clk2. Further, for the clock signal pair including clock signals clk1b 412 and clk2 414, the cell 430 is determined to be a source disturb cell. For example, as the output Q of the cell 430 is connected to the data input D of the cell 432, the clock input ck of the cell 430 is connected to the clock input clk1b 412, and the clock input ck of the cell 432 is connected to the clock input clk2 414, the cell 430 is determined to be a source disturb cell for the clock signal pair including clock signals clk1b 412 and clk2 414.

The source disturb cells and corresponding clock signal pairings of the circuit design may be stored in the memory 130. For example, with reference to FIG. 4, the source disturbed cell 430 with the corresponding clock signal pairing (clk1a 410, clk2 414), and the source disturb cell 430 with the corresponding clock signal pairing (clk1b 412, clk2 414) are stored in the memory 130. The clock signal pairings are stored along with a reference to the number of disturb cells associated with each clock signal pairing. For example, the clock signal pairing (clk1a, clk2) is associated with the source disturb cell 430 and sink disturb cell 432, and the clock signal pairing (clk1b, clk2) is associated with the source disturb cell 430 and the sink disturb cell 432. In one or more examples, a clock signal pair is not used when the clock signal pair exceeds one or more implementation specific limits (e.g., thresholds). The implementation specific limits may be user (e.g., designer) defined, based on a manufacturing limitation, or determined from the corresponding circuit design. In one example, a clock signal pair that is associated with a number of source sink cells that exceeds a corresponding implementation limit is not used.

At 320 of the method 300, test patterns (e.g., the test patterns 134) are determined by the test pattern generation engine 110. The test patterns are determined based on the clock data (e.g., clock signal pairings and disturb cells) determined at 310 of the method 300. In one example, determining the test patterns 134 includes determining the state of the clock signals during clock cycles at 322 of the method 300. For example, when a first clock signal is turned on the test pattern generation engine turns off other clock signals not able to be paired with the clock signal. Clock signals that are not able to be paired with each other can be clock signals that are received by the same cell of a circuit design. Further, the clock signals that are not able to be paired with each are other are forbidden clock signal pairs. In one example, with reference to FIG. 4, the clock signal clk1*a* and clock signal clk1*b* are both received by the clock input ok of the cell 430. Accordingly, the clock signals clk1*a* and clk1*b* are not able to be paired with each other. During a clock cycle when the clock signal clk1*a* is turned on, the clock signal clk1*b* is turned off. Further, during a clock cycle when the clock signal clk1*b* is turned on, the clock signal clk1*a* is turned off.

Further, determining the test patterns includes 324 of the method 300, determining the order of the clock signals within the test patterns. The order is based on the determined clock signal pairings and associated source disturb cells. In one example, the order of the clock signals is determined based on the number of source disturb cells associated with each clock signal pairing. For example, a clock signal pairing associated with a relatively smaller number of disturb cells is clocked before a clock signal pairing associated with a relatively larger number of disturb cells so as to minimize the number of care bits that need to be added during test generation to ensure that the values of the source disturb cells are maintained. In one example, care bits are values (e.g., 0's and 1's) placed on control points (e.g., scan cells and primary inputs) to ensure fault detection when simulating the circuit design.

The state of the source disturb cells used during the generation of a test pattern is maintained during each corresponding clock cycle. The state of the disturb cells are maintained using care bits. In one example, a clock input of a source disturb cell is turned off to maintain the state of the source disturb cell. In another example, the data input of a cell is set to a desired value. By maintaining the state of the disturb cells, sequential test pattern generation is avoided. In sequential test pattern generation, each capture cycle of a pattern with multiple capture clock cycles requires justification of values, creating an exponentially increased search space with each added cycle. In one example, maintaining the state of a cell includes turning the clock input to the cell off. If the state of the cell is not maintained by turning the state of the cell off, the output value of the cell is set to the data input value of the cell. If the state of the state of the cell is not maintained by setting the output value of the cell to the data input value of the cell, a failure is reported. If the state is maintained, a success is reported.

Determining test patterns further includes staggering one or more clock signals at 326 of the method 300. Clock signals are staggered within the clock cycles of a test pattern to avoid X values that occur during simulation of a circuit design (e.g., the circuit design 132). In one example, clock signals are staggered by a test pattern that includes clock signals associated with disturb cells. Staggering the clock signals arranges the clock signals such that the staggered clock signals occur during different clock cycles. The staggered clock signal may be clock signals of the same clock signal pair. Staggering clock signals may be used to stagger clock signals of clock signal pairs associated with a disturb cell. Staggering the clock signals ensures that only one of the clock signals of a clock signal pair associated with a disturb cell is turned on during a clock cycle. Accordingly, during the clock cycles that the staggered clock signals are driven, a source disturb cell is no longer disturbed as the cell does not capture a value based on a first clock signal while a connected cell receives the value based on a second clock signal during the same cycle. In one example, the cycles during which the clock signals are staggered are sequential with each other. Staggering the clock signals ensures that during a first clock cycle, a cell captures a value based on a first clock signal of a clock signal pair and during a second clock cycle, a connected cell receives the value based on a second clock signal of the clock signal pair.

In one example, for a single clock cycle, without clock signal staggering, a test pattern may have three clock signals (e.g., clk1 clk2 clk3) turned on during the same clock cycle. After clock staggering, the test pattern is generated having three clock cycles. During each clock cycle, one clock signal is turned on, while the other clock signals are turned off. In another example, a test pattern includes two cycles. Without staggering the clock signals, the test pattern may have two clock cycles pulsing three clocks each. For example, during a first clock cycle, clock signals clk1 clk2 clk3 are turned on, and during a second clock cycle, the clock signals clk1 clk2 clk3 are turned on again. Staggering the clock signals generates a test pattern having six clock cycles. During each clock cycle, a different one of the clock signals is turned on and the other clock signals are turned off. For example, for a circuit design including the clock signals clk1, clk2, and clk3, the clock signal clk1 is turned on during the first two of the clock cycles, the clock signal clk2 is turned on during the next two of the clock cycles, and the clock signal clk3 is turned on during the last two of the clock cycles. When one of the clock signals clk1, clk2, or clk3 is turned on, the other clock signals are turned off.

The test pattern generation engine 110 stores the test patterns (e.g., the test patterns 134) in the memory 130. The test patterns include the state of the clock signals during each clock cycle and the values of the cells during the clock cycles.

Figure 5:
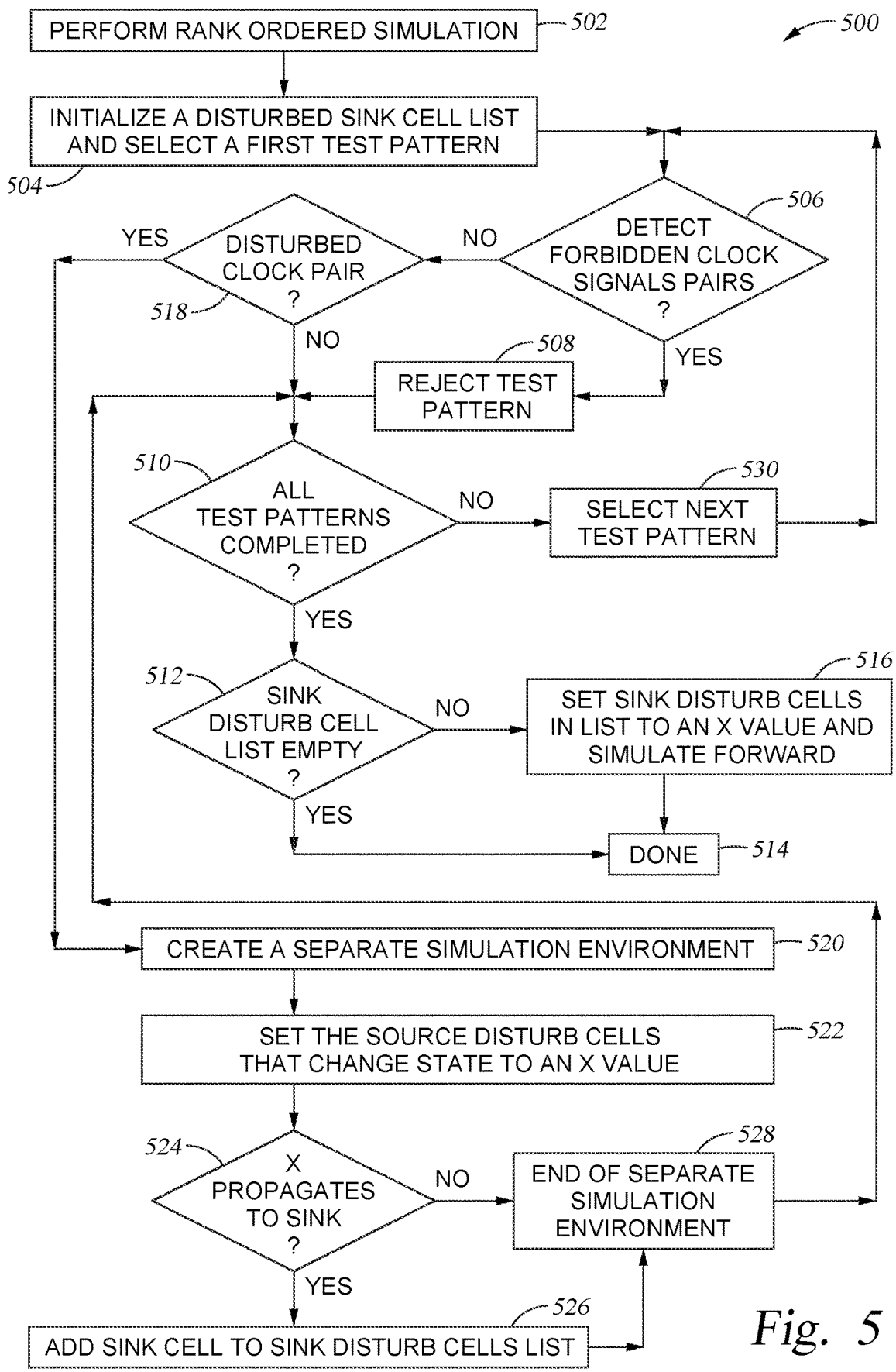
FIG. 5 depicts a flowchart of a method for generating simulating a circuit design, in accordance with some embodiments of the present disclosure.

FIG. 5 illustrates a flowchart of a method 500 for simulating a circuit design. The method 500 is performed by the circuit simulation engine 120. For example, one or more processors of the circuit simulation engine 120 executes instructions stored in a memory to perform the method 500. At 502, rank ordered simulation is performed. During rank ordered simulation, the circuit simulation engine 120 simulates the circuit design (e.g., circuit design 132) based on a ranking of the cells. Rank ordered simulation is performed in a main simulation environment during which values are read from and written to a block of memory associated with the main simulation environment. A ranking is assigned to each of the cells within the circuit design based on an order in which the cells are electrically coupled to each other. The rankings are applied such that a cell has a lower rank than the input cell or cells to the cell. In one or more examples, simulating the circuit design includes simulating the cells within the circuit design. The rank ordered simulation may assume that there are no faults and/or defects within the circuit design and simulates how an ideal circuit design may perform. Further, in a ranked ordered simulation, the cells of a circuit design are simulated in order such that cells that generate an output to other cells are simulated first.

At 504 of the method 500, the circuit simulation engine 120 initializes (e.g., empties) a sink disturb cell list and selects a first test pattern from the test patterns 134. A sink disturb cell list includes a list of sink disturb cells within a circuit design. At 506, the circuit simulation engine 120 determines whether the test pattern includes a forbidden clock signal pair. For example, a clock signal pair is determined to be a forbidden clock signal if two clock signals of the clock signal pair cannot be turned on during the same clock cycle. At 508, the circuit simulation engine 120 rejects a test pattern based on the determination that a test pattern includes a forbidden clock signal pair. The method 500 flows from 508 to 510 of the method 500.

At 510 of the method 500, the circuit simulation engine 120 determines whether or not all test patterns are completed. Based on a determination that all test patterns are completed, a determination as to whether or not the sink disturb cell list is empty is made at 512 of the method 500. Based on a determination that the sink disturb cell list is empty at 512 of the method 500, the method is completed at 514 of the method 500. Based on a determination that the sink disturb cell list is not empty at 512 of the method 500, the state of the sink disturb cells in the sink disturb cell list are set to an X value and the circuit design is simulated forward with the X value from that point at 516 of the method 500, and the method is completed at 514 of the method 500. At 516 of the method 500, the circuit simulation engine 120 sets the sink disturb cells within a circuit design which change state to an X value, and simulates the effect of the sink disturb cells forward in the circuit design.

Based on a determination that all of the clock signals, clock cycles, and test patterns are not completed at 510 of the method 500, the method 500 proceeds to 530 where a next test pattern is selected, and then returns to 506 of the method 500. Further, based on a determination at 506 that there no forbidden clock signals, the method 500 proceeds to 518 to determine whether or not a disturbed clock signal pair is present in the test patterns. A disturbed clock signal pair is a clock signal pair for a source disturb cell. If a disturbed clock signal pair is detected at 518 of the method 500, the circuit simulation engine creates a separate simulation environment for the disturbed clock signal pair at 520 of the method 500. The separate simulation environment is independent, or separate from, the simulation environment of the corresponding test pattern. Each test pattern is associated with a simulation environment during which the cells of the circuit design are loaded with values, and the clock signals are driven based on the test pattern to simulate the circuit design. A separate simulation environment is created such that for the current test pattern, multiple independent simulation environments are used. In a separate simulation environment, simulation values are read and written to a block of memory separate from the block of memory associated with the main simulation environment and not associated with other simulation environments. Simulating the circuit design in separate simulation environment does not change the values associated with the main simulation environment. To create a separate simulation environment, data for each cell in the circuit design (e.g., the circuit design 132) is stored. In one example, parallel pattern simulation is applied such that multiple test patterns are simulated in parallel (e.g., during an overlapping period of time) with each other in associated simulation environments. In one example, the processor or processors of the circuit simulation engine 120 use a 64 bit word for each cell of a circuit design. To create a separate simulation environment, a second 64 bit word is allocated for each cell of the circuit design, allocating a new set of values for each cell.

At 522 of the method 500, the source disturb cells that change state based on the simulation 502 are set to an X value. The effect of the X value is simulated through the circuit design. All of the cells that receive the X value are identified. At 524 of the method 500, if the X value propagates to a sink disturb cell, the sink disturb cell is added to the sink disturb list at 526 of the method 500 and the separate simulation environment is ended at 528. If at 524 of the method 500, the X value does not propagate to a sink cell, the separate simulation environment is ended at 528 of the method 500. The method proceeds to 510 of the method 500 after 528 of the method 500.

At 514 of the method 500, the simulation process for a circuit design with regard to each of the test patterns is completed, and test patterns are output. The test patterns are saved to the memory 130.

Figure 6A:
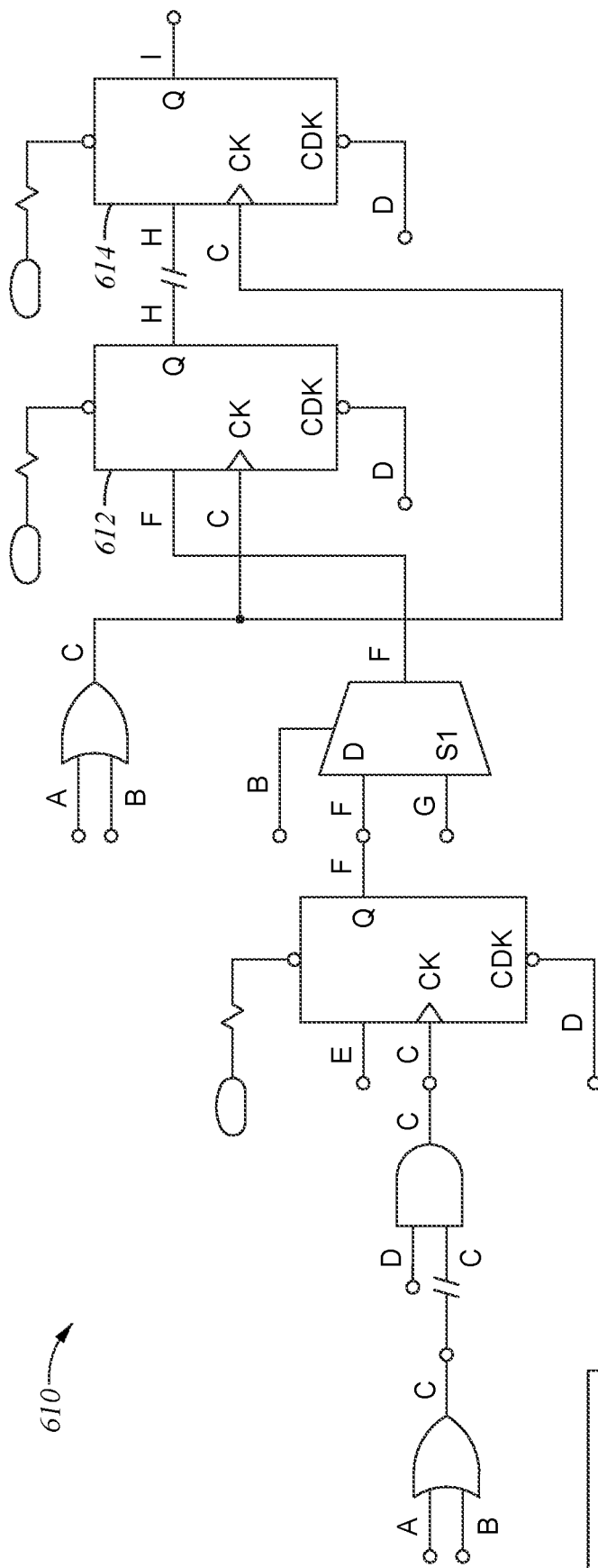
FIG. 6A illustrates an example circuit designs and corresponding cell values, in accordance with some embodiments of the present disclosure.

FIG. 6A illustrates the example simulation environment 610 of a circuit design. In the simulation environment 610, the cell 612 outputs an X value, based on a simulation performed with typical test circuit simulation process. For example, the cell 612 receives two different clock signals; accordingly, the output of the cell 612 has an X value. The outputted X value is captured by the cell 614. Accordingly, the output value of the cell 614 is an X value.

Figure 6B:
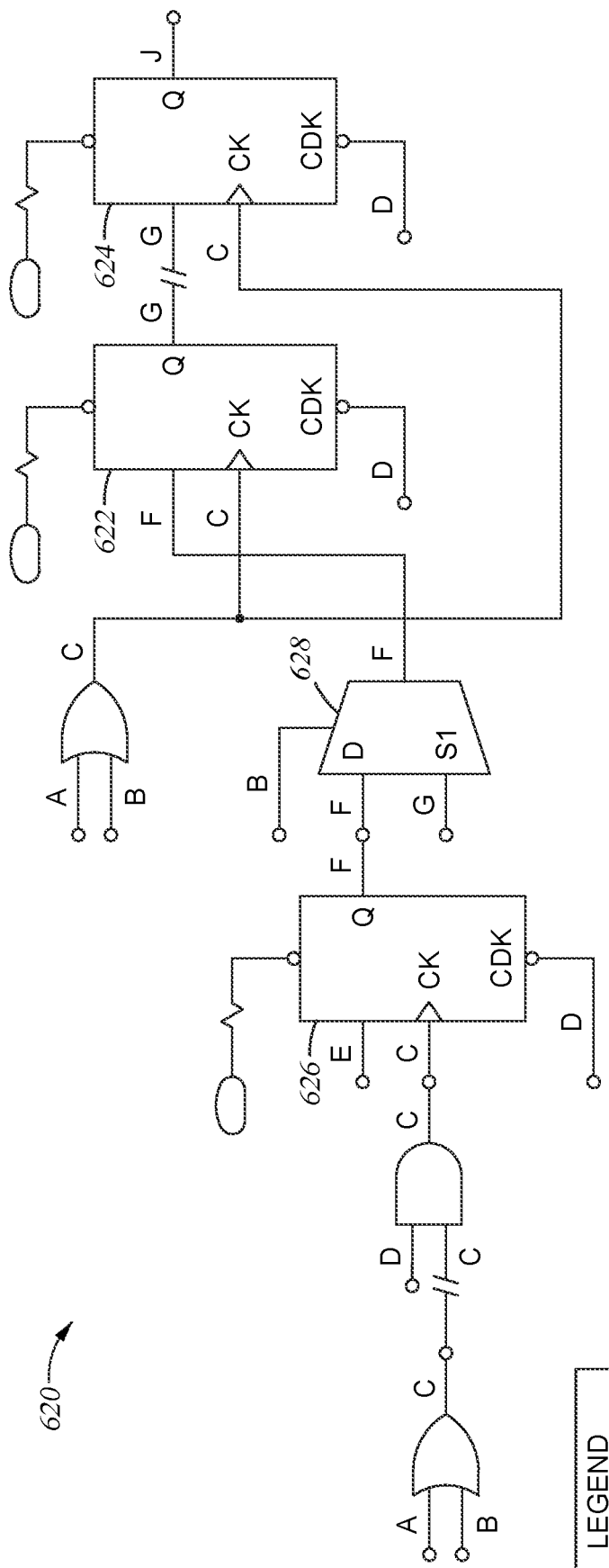
FIG. 6B illustrates an example circuit designs and corresponding cell values, in accordance with some embodiments of the present disclosure.

FIG. 6B illustrates the example simulation environment 620 of the same circuit that is simulated in the simulation environment 610. The simulation environment 620 is performed as described with regard to method 500 of FIG. 5. In the simulation environment 620, the cell 622 does not change value in the first cycle because its source disturb cell, cell 626, does not change in the first cycle. The cell 626 is a leading-edge flop (DFF). The output of the cell 626 changes values when the input clock signal transitions from a value of 0 to 1. In such a case, when data input just before leading edge of the clock signal has a value of 1, the cell 626 is loaded with a value of 1, and there is not change to the output value of the cell 626. The output values of the cell 626 are 11100. The cell 622 captures the previous value of the cell 626. As the propagation path of the output of the cell 626 includes a gate (e.g., multiplexer 628), and/or the output values change with clock signal transitions from 0 to 1, the output of the cell 624 does not become an X value.

Figure 7:
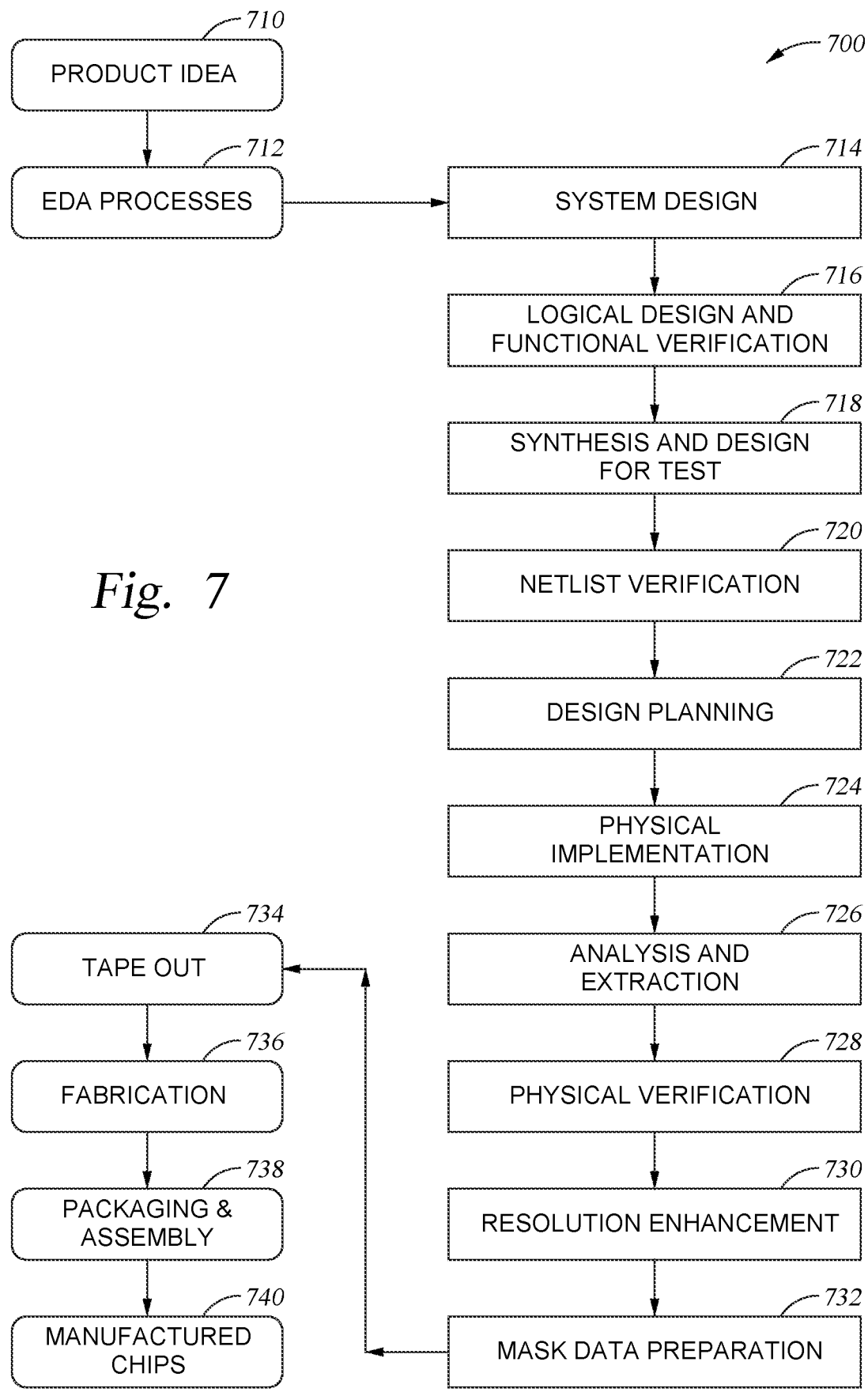
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   determining clock data of a circuit design, the circuit design including clock signals and cells, wherein determining the clock data comprises:
      determining a first clock signal pair from the clock signals; and
      determining a disturb cell of the cells based on the first clock signal pair, wherein the disturb cell is electrically coupled to a first clock signal of the first clock signal pair, the disturb cell is electrically coupled to a second cell of the cells, and the second cell is electrically coupled to a second clock signal of the first clock signal pair, and an input of the second cell is electrically coupled to an output of the disturb cell;

generating a first test pattern based on the clock data; and
outputting the first test pattern to a memory.

2. The method of claim 1, wherein determining the clock data further comprises determining, for each cell of the circuit design, a cell clock signal.

3. The method of claim 1, wherein determining the clock data further comprises determining capture clock signals of the clock signals, wherein the capture clock signals are used by the cells to capture values.

4. The method of claim 1, wherein generating the first test pattern comprises:
determining that the first clock signal and a third clock signal form a forbidden clock signal pair; and
turning off the third clock signal during a clock cycle during which the first clock signal is turned on.

5. The method of claim 1, wherein generating the first test pattern comprises determining an order of the clock signals within the first test pattern based on the first clock signal pair and the disturb cell.

6. The method of claim 1, wherein generating the first test pattern comprises staggering the first clock signal and the second clock signal by turning the first clock signal on during a first clock cycle, and turning the second clock signal on during a second clock cycle.

7. The method of claim 1, further comprising simulating the circuit design based on the first test pattern.

8. A system comprising:
a memory storing instructions: and
a processor, coupled with the memory and configured to execute the instructions, the instructions when executed cause the processor to:
determine that a first clock signal pair of a first test pattern is associated with a first source disturb cell of a circuit design, wherein the first source disturb cell is electrically coupled to a first clock signal of the first clock signal pair, a second cell of the circuit design is electrically coupled to a second clock signal of the first clock signal pair, and an input of the second cell is electrically coupled to an output of the first source disturb cell;
create a first simulation environment based on the determination that the first clock signal pair is associated with the first source disturb cell;
set a value of the first source disturb cell to an unknown value;
detect a first sink disturb cell based on a determination that the unknown value propagates from the first source disturb cell to the first sink disturb cell; and
set a value of the first sink disturb cell to the unknown value and simulating the circuit design.

9. The system of claim 8, wherein the instructions when executed further cause the processor to:
determine that each clock signal of a second clock signal pair of a second test pattern is connected to a same cell of the circuit design; and
reject the second test pattern based on determining that each clock signal of the second clock signal pair is connected to the same cell.

10. The system of claim 8, wherein the instructions when executed further cause the processor to:
determine a second clock signal pair of a second test pattern is associated with a second source disturb cell of the circuit design;
create a second simulation environment based on the determination that the second clock signal pair is associated with the second source disturb cell; and
set a value of the second source disturb cell to the unknown value.

11. The system of claim 10, wherein the instructions when executed further cause the processor to:
detect a second sink disturb cell based on a determination that the unknown value propagates from the second source disturb cell to the second sink disturb cell; and
set a value of the second sink disturb cell to the unknown value.

12. The system of claim 8, wherein the instructions when executed further cause the processor to:
simulate the circuit design with first values for cells of the circuit design based on a ranking of cells of the circuit design, wherein the ranking corresponds to an order in which the cells are electrically coupled with each other.

13. The system of claim 12, wherein creating the first simulation environment comprises generating second values for one or more cells of the circuit design.

14. A non-transitory computer readable medium comprising stored instructions, which when executed by a processor, cause the processor to:
determine, for a circuit design comprising clock signals and cells, a first clock signal pair of the clock signals and a first source disturb cell of the cells,
wherein the first source disturb cell is electrically coupled to a first clock signal of the first clock signal pair,
wherein the first source disturb cell is electrically coupled to a second cell of the cells,
and wherein the second cell is electrically coupled to a second clock signal of the first clock signal pair;
generate a first test pattern based on the first clock signal pair and the first source disturb cell;
create a first simulation environment based on a determination that the first clock signal pair is associated with the first source disturb cell;
detect a sink disturb cell of the cells based on a determination that an unknown value propagates from the first source disturb cell to the sink disturb cell; and
set a value of the sink disturb cell to the unknown value.

15. The non-transitory computer readable medium of claim 14, wherein generating the first test pattern comprises determining an order of the clock signals based on the first clock signal pair and the first source disturb cell.

16. The non-transitory computer readable medium of claim 14, wherein generating the first test pattern comprises staggering the first clock signal and the second clock signal by turning the first clock signal on during a first clock cycle and off during a second clock cycle, and turning the second clock signal on during the second clock cycle and off during the first clock cycle.

17. The non-transitory computer readable medium of claim 14, wherein the processor is further caused to:
determine that each clock signal of a second clock signal pair of a second test pattern is connected to a same cell of the circuit design; and
reject the second test pattern based on determining that each clock signal of the second clock signal pair is connected to the same cell.

18. The non-transitory computer readable medium of claim 14, wherein the processor is further caused to:
determine a second clock signal pair of a second test pattern is associated with a second source disturb cell of the circuit design;
create a second simulation environment based on the determination that the second clock signal pair is associated with the second source disturb cell; and set a value of the second source disturb cell to the unknown value.

19. The non-transitory computer readable medium of claim 18, wherein the processor is further caused to:
   detect a second sink disturb cell based on a determination that the unknown value propagates from the second source disturb cell to the second sink disturb cell; and
   set a value of the second sink disturb cell to the unknown value.

20. The non-transitory computer readable medium of claim 14 further, wherein the processor is further caused to:
   simulate the circuit design with first values for the cells of the circuit design based on a ranking of cells of the circuit design, wherein the ranking corresponds to an order in which the cells are electrically coupled with each other, and wherein creating the first simulation environment comprises generating second values for the cells of the circuit design.

\* \* \* \* \*